United States Patent
Kamihara et al.

(10) Patent No.: US 10,011,366 B2
(45) Date of Patent: Jul. 3, 2018

(54) FUEL TANK, MAIN WING, AIRCRAFT FUSELAGE, AIRCRAFT, AND MOBILE BODY

(71) Applicant: MITSUBISHI HEAVY INDUSTRIES, LTD., Tokyo (JP)

(72) Inventors: Nobuyuki Kamihara, Tokyo (JP); Masayuki Yamashita, Tokyo (JP); Toshio Abe, Tokyo (JP); Yuichiro Kamino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 524 days.

(21) Appl. No.: 14/382,961

(22) PCT Filed: Mar. 15, 2013

(86) PCT No.: PCT/JP2013/057348
§ 371 (c)(1),
(2) Date: Sep. 4, 2014

(87) PCT Pub. No.: WO2013/146335
PCT Pub. Date: Oct. 3, 2013

(65) Prior Publication Data
US 2015/0041592 A1 Feb. 12, 2015

(30) Foreign Application Priority Data
Mar. 26, 2012 (JP) ................................. 2012-069375

(51) Int. Cl.
*B64D 37/04* (2006.01)
*B64C 3/34* (2006.01)
(Continued)

(52) U.S. Cl.
CPC ........ *B64D 37/04* (2013.01); *B60K 15/03177* (2013.01); *B64C 3/34* (2013.01); *B64D 37/08* (2013.01); *Y02T 50/44* (2013.01)

(58) Field of Classification Search
CPC .. B64D 37/04; B64D 37/08; B60K 15/03177; B64C 3/34; Y02T 50/44
See application file for complete search history.

(56) References Cited

U.S. PATENT DOCUMENTS 4,169,816 A * 10/1979 Tsien .................... H01B 1/24
                                                    252/511
4,291,816 A    9/1981 Lamoureux
(Continued)

FOREIGN PATENT DOCUMENTS

CN    1950200       4/2007
CN    101466598     6/2009
(Continued)

OTHER PUBLICATIONS

Extended European Search Report dated Nov. 2, 2015 in corresponding European patent application No. 13 76 9070.
(Continued)

*Primary Examiner* — Zeev V Kitov
(74) *Attorney, Agent, or Firm* — Wenderoth, Lind & Ponack, L.L.P.

(57) ABSTRACT

A fuel tank in which it is possible to reduce working hours or cost in a manufacturing process and prevent an increase in weight in, a main wing, an aircraft fuselage, an aircraft, and a mobile body. The fuel tank is provided with a structural member using carbon fiber reinforced plastic in which a reinforcing material includes carbon fibers and a matrix includes plastic, wherein the matrix has electrical conductivity applied thereto. Furthermore, a cut surface of the structural member, which is formed by cutting the
(Continued)

structural member, may be exposed to the inside in which fuel is accommodated, of a fuel tank.

6 Claims, 4 Drawing Sheets

(51) Int. Cl.
    *B64D 37/08*    (2006.01)
    *B60K 15/03*    (2006.01)

(56) References Cited

U.S. PATENT DOCUMENTS

| | | | |
|---|---|---|---|
| 4,352,142 | A | 9/1982 | Olson |
| 4,556,439 | A | 12/1985 | Bannink, Jr. |
| 4,556,591 | A | 12/1985 | Bannink, Jr. |
| 4,556,592 | A | 12/1985 | Bannink, Jr. |
| 4,755,904 | A | 7/1988 | Brick |
| 5,332,178 | A | 7/1994 | Williams |
| 5,855,272 | A | 1/1999 | Symons et al. |
| 5,866,272 | A | 2/1999 | Westre et al. |
| 6,086,975 | A | 7/2000 | Brick et al. |
| 6,114,050 | A | 9/2000 | Westre et al. |
| 6,320,118 | B1 | 11/2001 | Pridham et al. |
| 6,327,132 | B1 | 12/2001 | Andrivet et al. |
| 7,900,412 | B2 | 3/2011 | West et al. |
| 2005/0175813 | A1 | 8/2005 | Wingert et al. |
| 2005/0271859 | A1 | 12/2005 | Tuss et al. |
| 2008/0012681 | A1* | 1/2008 | Kadar ............... H01H 77/04 337/298 |
| 2008/0128430 | A1* | 6/2008 | Kovach ............... B32B 27/00 220/586 |
| 2008/0137259 | A1 | 6/2008 | Heeter et al. |
| 2008/0295955 | A1 | 12/2008 | Cawse et al. |
| 2008/0297967 | A1 | 12/2008 | Winter et al. |
| 2009/0001217 | A1 | 1/2009 | Dufresne et al. |
| 2009/0224102 | A1* | 9/2009 | White ............... B64C 1/068 244/119 |
| 2009/0227162 | A1 | 9/2009 | Kruckenberg et al. |
| 2010/0020461 | A1 | 1/2010 | Heeter et al. |
| 2010/0061031 | A1 | 3/2010 | Lopez-Reina Torrijos et al. |
| 2010/0107513 | A1 | 5/2010 | Buchanan et al. |
| 2010/0132875 | A1 | 6/2010 | Ackerman et al. |
| 2010/0178487 | A1 | 7/2010 | Arai et al. |
| 2010/0219287 | A1 | 9/2010 | Sanchez-Brunete Alvarez et al. |
| 2010/0224724 | A1 | 9/2010 | Kamino et al. |
| 2010/0264274 | A1 | 10/2010 | Bradley et al. |
| 2011/0003163 | A1 | 1/2011 | Wood |
| 2011/0008587 | A1 | 1/2011 | Ruskin |
| 2011/0147674 | A1 | 6/2011 | Arai et al. |
| 2011/0151235 | A1 | 6/2011 | Arai et al. |
| 2011/0255205 | A1 | 10/2011 | Lopez-Reina Torrijos et al. |
| 2011/0284694 | A1 | 11/2011 | Yamaguchi et al. |
| 2011/0287246 | A1 | 11/2011 | Arai et al. |
| 2011/0291056 | A1 | 12/2011 | Arai et al. |
| 2011/0297315 | A1 | 12/2011 | Kishida et al. |
| 2011/0297790 | A1 | 12/2011 | Yamaguchi et al. |
| 2012/0012710 | A1 | 1/2012 | Yamaguchi et al. |
| 2012/0058297 | A1 | 3/2012 | Arai et al. |
| 2012/0138609 | A1 | 6/2012 | Gerken et al. |
| 2012/0184185 | A1 | 7/2012 | Kanazawa et al. |
| 2012/0236457 | A1 | 9/2012 | Yamakoshi et al. |
| 2012/0258323 | A1 | 10/2012 | Brown |
| 2013/0043351 | A1 | 2/2013 | Kamihara et al. |
| 2013/0099058 | A1 | 4/2013 | Payne et al. |
| 2013/0319750 | A1 | 12/2013 | Waku |
| 2015/0014308 | A1 | 1/2015 | Kovach et al. |
| 2016/0229552 | A1 | 8/2016 | Gross et al. |

FOREIGN PATENT DOCUMENTS

| | | |
|---|---|---|
| CN | 101501114 | 8/2009 |
| CN | 101588919 | 11/2009 |
| CN | 101984009 | 3/2011 |
| CN | 102361791 | 2/2012 |
| CN | 102365216 | 2/2012 |
| CN | 102395465 | 3/2012 |
| CN | 102883949 | 1/2013 |
| EP | 0 248 122 | 12/1987 |
| EP | 0 783 960 | 7/1997 |
| EP | 1 413 514 | 4/2004 |
| EP | 2 053 078 | 4/2009 |
| EP | 2 354 003 | 8/2011 |
| EP | 2 415 693 | 2/2012 |
| EP | 2 511 174 | 10/2012 |
| JP | 2-63725 | 3/1990 |
| JP | 6-16846 | 1/1994 |
| JP | 7-96579 | 4/1995 |
| JP | 9-193296 | 7/1997 |
| JP | 11-138669 | 5/1999 |
| JP | 2001-510422 | 7/2001 |
| JP | 2001-304492 | 10/2001 |
| JP | 2003-154591 | 5/2003 |
| JP | 2006-265751 | 10/2006 |
| JP | 2007-521995 | 8/2007 |
| JP | 2007-301838 | 11/2007 |
| JP | 2009-138199 | 6/2009 |
| JP | 2010-508416 | 3/2010 |
| JP | 2010-132286 | 6/2010 |
| JP | 2010-194749 | 9/2010 |
| JP | 2010-234900 | 10/2010 |
| JP | 2010-235133 | 10/2010 |
| JP | 2010-280904 | 12/2010 |
| JP | 2011-84138 | 4/2011 |
| JP | 2011-168792 | 9/2011 |
| RU | 2 192 991 | 11/2002 |
| RU | 2 217 320 | 11/2003 |
| RU | 2 236 635 | 6/2004 |
| RU | 2 381 242 | 2/2010 |
| RU | 2 436 688 | 12/2011 |
| RU | 2 448 875 | 4/2012 |
| SU | 1362681 | 12/1987 |
| WO | 99/51494 | 10/1999 |
| WO | 2006/069996 | 7/2006 |
| WO | 2011/050040 | 4/2011 |
| WO | 2012/074639 | 6/2012 |
| WO | 2012/111704 | 8/2012 |

OTHER PUBLICATIONS

Decision on patent grant for invention dated Nov. 24, 2015 in corresponding Russian patent application No. 2014133705/11 (054426) (with English translation).
Office Action dated Dec. 15, 2015 in corresponding Japanese patent application No. 2014-507684 (with English translation).
Office Action dated Oct. 22, 2015 in corresponding Korean patent application No. 2014-7023846 (with English translation).
Office Action dated Jul. 2, 2015 in corresponding Chinese patent application No. 201380014810.6 (with English translation).
Decision to Grant a Patent dated Jun. 14, 2016 in Japanese patent application No. 2014-507684.
Office Action dated May 12, 2015 in corresponding Japanese patent application No. 2014-507684 (with English translation).
International Search Report dated May 28, 2013 in International Application No. PCT/JP2013/057348.
Written Opinion of the International Searching Authority dated May 28, 2013 in International Application No. PCT/JP2013/057348.
Office Action dated Aug. 22, 2016 in Chinese Patent Application No. 201380048718.1, with English translation.
Office Action dated May 27, 2016 in Chinese Patent Application No. 201480018287.9, with English translation.
Office Action dated Apr. 27, 2016 in Chinese Patent Application No. 201480018314.2, with English translation.
Extended European Search Report dated Aug. 30, 2016 in European Patent Application No. 14774804.0.
International Search Report dated Jan. 7, 2014 in International (PCT) Application No. PCT/JP2013/077434.
International Search Report dated Apr. 22, 2014 in International (PCT) Application No. PCT/JP2014/053693.

(56) References Cited

OTHER PUBLICATIONS

International Search Report dated Apr. 22, 2014 in International (PCT) Application No. PCT/JP2014/051831.
Office Action dated Jan. 20, 2017 in Russian Application No. 2015140423, with English translation.
Office Action dated Aug. 4, 2016 in Russian Application No. 2015109128, with English translation.

* cited by examiner

FUEL TANK, MAIN WING, AIRCRAFT FUSELAGE, AIRCRAFT, AND MOBILE BODY

TECHNICAL FIELD

The present invention relates to a fuel tank using carbon fiber reinforced plastic as a structural member thereof, a main wing, an aircraft fuselage, an aircraft, and a mobile body.

BACKGROUND ART

There is a case where a main wing of an aircraft is used as a fuel tank capable of accommodating fuel. A fuel tank integrated with the main wing and having a wing structure of a liquid-tight structure in which oil does not leak is called an integral tank. The integral tank has a tendency to apply a composite material, for example, carbon fiber reinforced plastic (CFRP) thereto for the purpose of weight reduction. In the CFRP, carbon fibers are used as reinforcing materials and synthetic resin is used as a matrix.

In PTL 1, technique is disclosed which is an invention relating to a three-dimensional fiber-reinforced resin composite material and in which a selvage warp is configured by an electrically-conductive material having higher electrical conductivity than an in-plane direction yarn n order to apply electrical conductivity to a fiber-reinforced resin composite material without impairing productivity. Furthermore, in PTL 2, a technique is disclosed which is an invention relating to a prepreg and a carbon fiber reinforced composite material and includes electrically-conductive particles or fibers therein for the purpose of having both excellent impact resistance and electrical conductivity. Furthermore, in PTL 3, a technique is disclosed which is an invention relating to an improved composite material and includes electrically-conductive particles dispersed in polymeric resin therein for the purpose of having electrical conductivity and causing little or no weight increase compared to a standard composite material.

CITATION LIST

Patent Literature

[PTL 1] Japanese Unexamined Patent Application Publication No. 2007-301838
[PTL 2] Japanese Unexamined Patent Application Publication No. 2010-280904
[PTL 3] Japanese Unexamined Patent Application Publication No. 2011-168792

SUMMARY OF INVENTION

Technical Problem

Incidentally, in a case where the CFRP is used in a fuel tank of an aircraft, end portions of carbon fibers are exposed to the inside of the fuel tank on the surface of a CFRP component, particularly, a cut surface formed by cutting work.

In this case, if a lightning current flows through the surface of the CFRP component or the cut surface at the time of a lightning strike to a main wing, there is a concern that electric discharge may occur between the carbon fibers at the end portions of the carbon fibers. As a measure against the electric discharge, a method to apply a sealant or the like onto the surface of the CFRP component or the cut surface, thereby confining a generated current inside is adopted. However, due to the work applying the sealant or the like, in a manufacturing process of the fuel tank, working hours or cost increases. Furthermore, the weight of the main wing increases due to the sealant applied thereto.

In addition, the above-described problem is not limited to the integral tank integrated with the main wing of an aircraft and also occurs in a container of a fuel through which fuel flows. In the following, description will be made regarding the fuel cell container as being included in the fuel tank as well. Furthermore, the same problem also occurs in a fuselage of an aircraft having a fuel tank, and a mobile body such as an automobile with a fuel tank mounted thereon other than an aircraft.

The present invention has been made in view of such circumstances and has an object to provide a fuel tank in which is possible to reduce working hours or cost in a manufacturing process and prevent an increase in weight in, a main wing, an aircraft fuselage, an aircraft, and mobile body.

Solution to Problem

In order to solve the above-described problem, fuel tank, a main wing, an aircraft fuselage, an aircraft, and a mobile body according to the present invention adopt the following means.

That is, a fuel tank according to the present invention includes a structural member using carbon fiber reinforced plastic in which a reinforcing material includes carbon fibers and a matrix includes plastic, wherein the matrix has electrical conductivity applied thereto.

According to this invention, the structural member of the fuel tank is the carbon fiber reinforced plastic in which the reinforcing material includes carbon fibers. Then, the matrix of the carbon fiber reinforced plastic includes plastic and has electrical conductivity applied thereto. In a case where electrical conductivity is not applied to the matrix and treatment of a sealant or the like is not carried out on an end portion of the structural member, if a lightning current flows through the end portion at the time of a lightning strike, there is a concern that electric discharge may occur between the reinforcing materials at the end portion. However, since electrical conductivity is applied to the matrix, electrical conduction between the reinforcing materials that are carbon fibers is secured, and thus the occurrence of electric discharge in the end portion of the structural member can be prevented.

In the above-described invention, a cut surface of the structural member, which is formed by cutting the structural member, may be exposed to an inside in which fuel is accommodated.

According to this invention, even if the end portion of the structural member is a cut surface and the cut surface is exposed to the inside in which fuel is accommodated, since electrical conductivity is applied to the matrix, electrical conduction between the reinforcing materials that are carbon fibers is secured, and thus the occurrence of electric discharge in the end portion of the structural member can be prevented.

In the above-described invention, it is preferable that the carbon fiber reinforced plastic have a resistivity in a plate thickness direction of less than or equal to 500 Ωcm.

Furthermore, a main wing according to the present invention has the above-described fuel tank as a structural body thereof, and an aircraft fuselage according to the present invention includes the above-described fuel tank.

According to these inventions, the structural body of the main wing is the fuel tank, or the aircraft fuselage is provided with the fuel tank, and the structural member of the fuel tank is the carbon fiber reinforced plastic. Then, since the matrix of the carbon fiber reinforced plastic includes plastic and has electrical conductivity applied thereto, electrical conduction between the reinforcing materials which include carbon fibers is secured, and thus the occurrence of electric discharge in the end portion of the structural member can be prevented.

Furthermore, an aircraft according to the present invention includes the above-described main wing or the above-described aircraft fuselage.

According to this invention, the main wing of the aircraft or the aircraft fuselage has the fuel tank as a structural body thereof and the structural member of the fuel tank is the carbon fiber reinforced plastic. Then, since the matrix of the carbon fiber reinforced plastic includes plastic and has electrical conductivity applied thereto, electrical conduction between the reinforcing materials which include carbon fibers is secured, and thus the occurrence of electric discharge in the end portion of the structural member can be prevented.

Furthermore, a mobile body according to the present invention includes the above-described fuel tank.

According to this invention, the mobile body has the fuel tank as a structural body thereof and the structural member of the fuel tank is the carbon fiber reinforced plastic. Then, since the matrix of the carbon fiber reinforced plastic includes plastic and has electrical conductivity applied thereto, electrical conduction between the reinforcing materials which include carbon fibers is secured, thus the occurrence of electric discharge in the end portion of the structural member can be prevented.

Advantageous Effects of Invention

According to the present invention, since electrical conductivity is applied to the matrix, electrical conduction between the reinforcing materials that are carbon fibers is secured, and thus the occurrence of electric discharge between the reinforcing materials in the end portion of the structural member can be prevented, and since a sealant or the like need not be separately provided at the end portion of the structural member, it is possible to reduce working hours or cost in a manufacturing process and prevent an increase in weight.

DESCRIPTION OF EMBODIMENTS

Hereinafter, an embodiment related to the present invention will be described with reference to the drawings.

First, the configuration of a main wing 1 of an aircraft related to this embodiment will be described.

Figure 1:
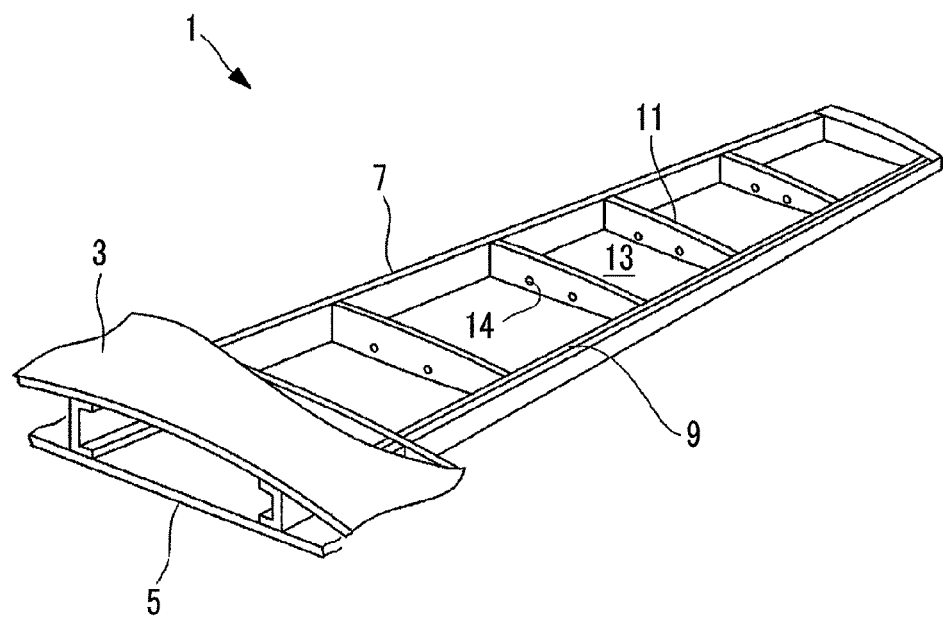
FIG. 1 is a perspective view showing a main wing according to an embodiment of the present invention and shows the main wing in a partial cut away.
Figure 2:
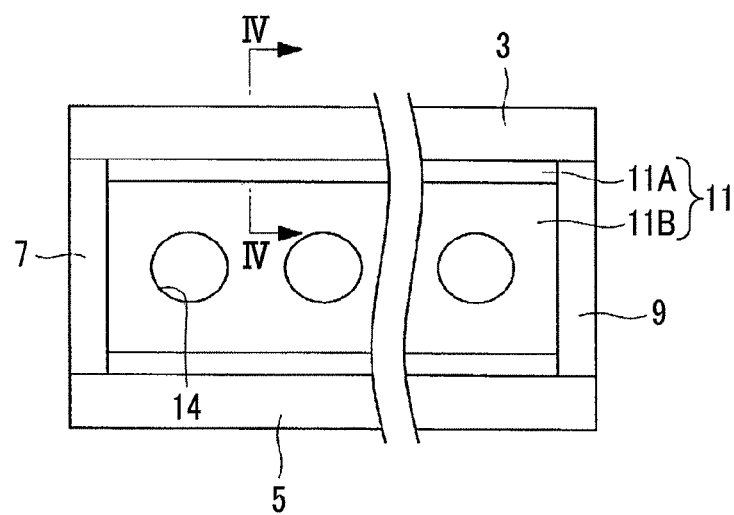
FIG. 2 is a vertical cross-sectional view showing the main wing according to the embodiment.

The main wing 1 is provided with an upper skin 3, a lower skin 5, a front spar 7, a rear spar 9, a plurality of ribs 11, and the like, as shown in FIGS. 1 and 2.

The upper skin 3 and the lower skin 5 are thin plates which configure the outer shape of the main wing 1 and also double as aerodynamic surfaces. The upper skin 3 and the lower skin 5 take charge of a portion of a tensile load or a compressive load acting on the main wing 1, along with the front spar 7, the rear spar 9, and a stringer (not shown).

The front spar 7 and the rear spar 9 are structural members which are provided extend in a wingspan direction of the main wing 1, as show in FIG. 1, and are disposed between the upper skin 3 and the lower skin 5. A plurality of stringers are auxiliary members which are provided to extend in the wingspan direction of the main wing 1 on the internal surface of the upper skin 3 or the lower skin 5, and are disposed between the front spar 7 and the rear spar 9.

The rib 11 is a structural member which is provided in a wingspread direction of the main wing 1, as shown in FIG. 1, and is disposed between the upper skin 3 and the lower skin 5. That, is, the rib 11 is a structural member which is provided to extend in a direction approximately orthogonal to the front spar 7 and the rear spar 9, and a plate-like member formed in a vertical cross-sectional shape of the main wing 1. In the rib 11, a plurality of openings 14 are formed in a longitudinal direction, as shown in FIG. 1 or 2.

In the main wing 1, a section surrounded by the front spar 7, the rear spar 9, the upper skin 3, and the lower skin 5 is used as a fuel tank 13 which accommodates fuel. A fuselage structure itself is regarded as a container, and thus the fuel tank 13 is called an integral tank. Then, the front spar 7, the rear spar 9, the upper skin 3, the lower skin 5, and the rib 11 are also structural members of the fuel tank 13. The fuel tank 13 has a liquid-tight structure in which fuel does not leak to the outside.

In the inside of the fuel tank 13, fuel piping (not shown) for supplying the fuel to the fuel tank 13, a plurality of fuel oil meters (not shown) for detecting a fuel oil quantity, wiring (not shown) for the fuel oil meter, and the like are installed.

Next, the structural members of the fuel tank 13 will be described.

Figure 3:
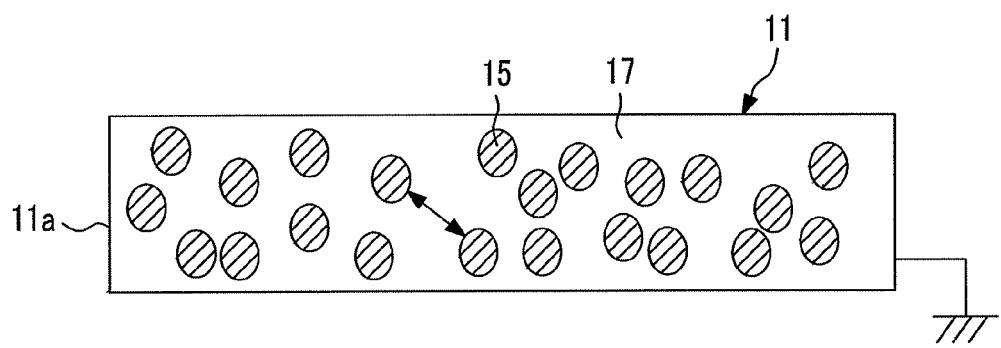
FIG. 3 is an end view showing a flange of a rib according to the embodiment and a view in a direction of an arrow in line III-III of FIG. 5.

For the structural members of the fuel tank 13, that is, the front spar 7, the rear spar 9, the upper skin 3, the lower skin 5, and the rib 11, carbon fiber reinforced plastic (CFRP) is used. Then, in the CFRP of this embodiment which is applied to the fuel tank 13, as shown in FIG. 3, a reinforcing material 15 includes carbon fibers and a matrix 17 includes plastic. Then, the matrix 17 has electrical conductivity applied thereto, and thus the CFRP which is used for the structural members of the fuel tank 13 has electrical conductivity. In FIG. 3, the rib 11 is shown. However, the same is true for other members.

In addition, in the fuel tank 13, all of the front spar 7, the rear spar 9, the upper skin 3, the lower skin and the rib 11 may not be formed of the CFRP and may be partially formed of metal such as an aluminum alloy.

The matrix 17 includes plastic such as thermosetting resin such as unsaturated polyester or epoxy resin, for example. As a method of applying electrical conductivity to the matrix 17, a variety of techniques to apply electrical conductivity to plastic such as thermosetting resin can be applied, and in this specification, detailed description thereof is omitted. As a method of applying electrical conductivity to the matrix 17, there is, for example, a method of including electrically-conductive particles or fibers in plastic, a method of applying electrical conductivity to plastic itself, or the like. The resistivity of the matrix 17 is, for example, several Ωcm.

Figure 4:
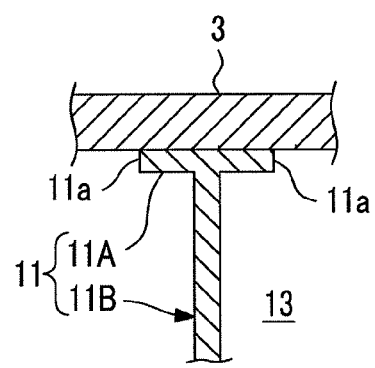
FIG. 4 is a partial vertical cross-sectional view showing an upper skin and the rib according to the embodiment and a cross-sectional view cut along line IV-IV of FIG. 2.

In the structural member made of the CFRP of the fuel tank 13, a cut surface formed by cutting work is exposed inside the fuel tank 13 in which fuel is accommodated. For example, as shown in FIG. 4, in a case where the rib 11 is configured to include a flange 11A, a web 11B, and the like, cut surfaces 11a are exposed to the inside of the fuel tank 13 at end portions of the flange 11A.

Figure 5:
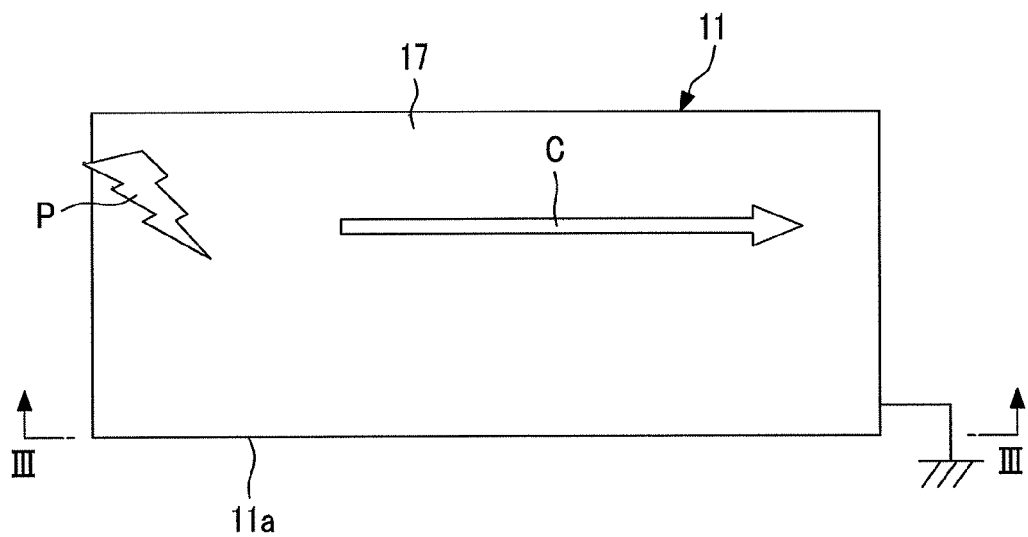
FIG. 5 is a top view showing the flange of rib according to the embodiment.

In this embodiment, since electrical conductivity is applied to the matrix 17, as shown in FIG. 5, when a lightning current C flows through the surface of the CFRP component or the cut surface 11a from a lightning strike point P at the time of a lightning strike to the rib 11 of the main wing 1, electrical conduction occurs between the reinforcing materials 15. As a result, electric discharge does not easily occur between the reinforcing materials 15 in the cut surface 11a of the CFRP.

In addition, this embodiment, unlike a technique to prevent corrosion by electrolytic action while preventing charging by applying an antistatic coating as a primer onto the surface of the structural member made of the CFRP, electrical conduction between the reinforcing materials 15 which include carbon fibers is secured by making the matrix 17 itself have electrical conductivity.

Figure 6:
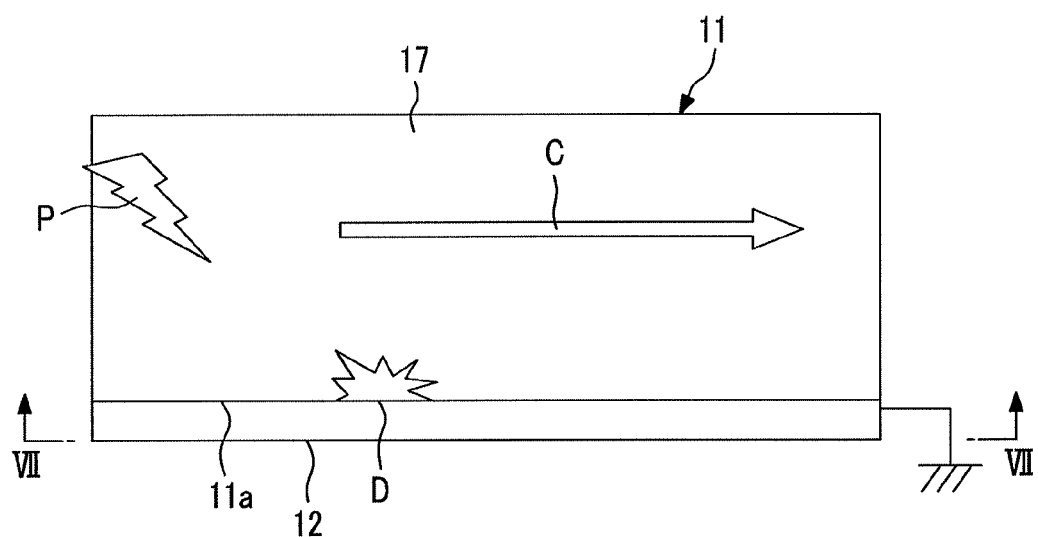
FIG. 6 is a top view showing a flange of a rib according to the related art.
Figure 7:
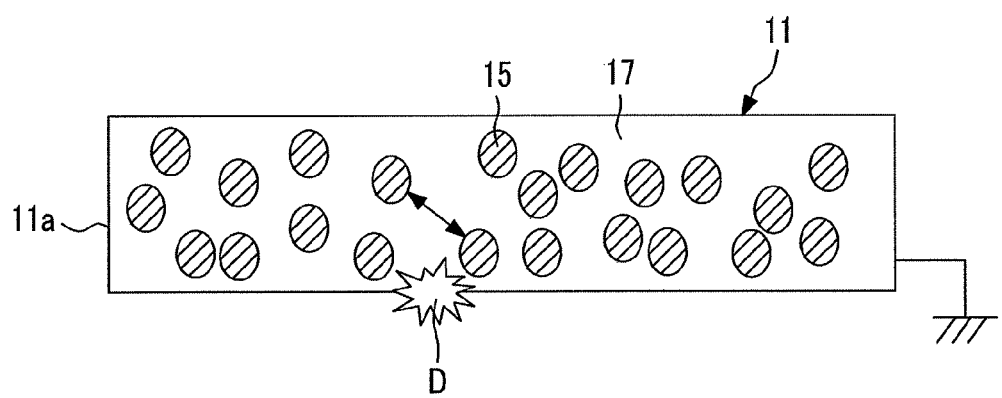
FIG. 7 is an end view showing the flange of the rib according to the related art and a view in a direction of an arrow in line VII-VII of FIG. 6.

Unlike this embodiment, in a case where electrical conductivity is not applied to the matrix 17, as shown in FIG. 6, when the lightning current C flows through the surface of the CFRP component or the cut surface 11a from the lightning strike point P at the time of a lightning strike to the rib 11 of the main wing 1, there is a concern that electric discharge D (refer to FIGS. 6 and 7) may occur between the reinforcing materials 15 at end portions of the reinforcing materials 15. In the past, as a measure against the electric discharge, as shown in FIG. 6, a method to apply a sealant 12 or the like onto the surface of the CFRP component or the cut surface 11a, thereby confining a generated current inside, has been adopted. However, due to the work of applying the sealant 12 or the like, in a manufacturing process of the fuel tank 13, working hours or cost increases. Furthermore, the weight of the main wing 1 increases due to the sealant 12 applied thereto.

In contrast, according to this embodiment, the structural members of the fuel tank 13 are the CFRP in which the reinforcing material 15 includes carbon fibers, and the matrix 17 includes plastic and has electrical conductivity applied thereto. Since electrical conductivity is applied to the matrix 17, even if the cut surface 11a is exposed to the inside of the fuel tank 13, electrical conduction between the reinforcing materials 15 is secured, and thus the occurrence of electric discharge between the reinforcing materials 15 in the cut surface 11a of the structural member can be prevented.

Next, with respect to each of the embodiment of the present invention and an example of the related art, a result obtained by creating a test body and carrying out a lightning protection test on the test body will be described.

In this test, a difference in a current value at which a spark is generated by applying a high-current waveform to the test body was compared in a structural member having the CFRP with electrical conductivity applied thereto (this embodiment) and a structural member having the CFRP with no electrical conductivity applied thereto (the related art).

A test method of the lightning protection test was carried out according to the description of Conducted Current Test of Aircraft Lightning Test Method (ARP5416) of SAF International. The high-current waveform applied to the test body is a component A waveform of a simulated lightning current which is defined in ARP5412A.

Figure 8:
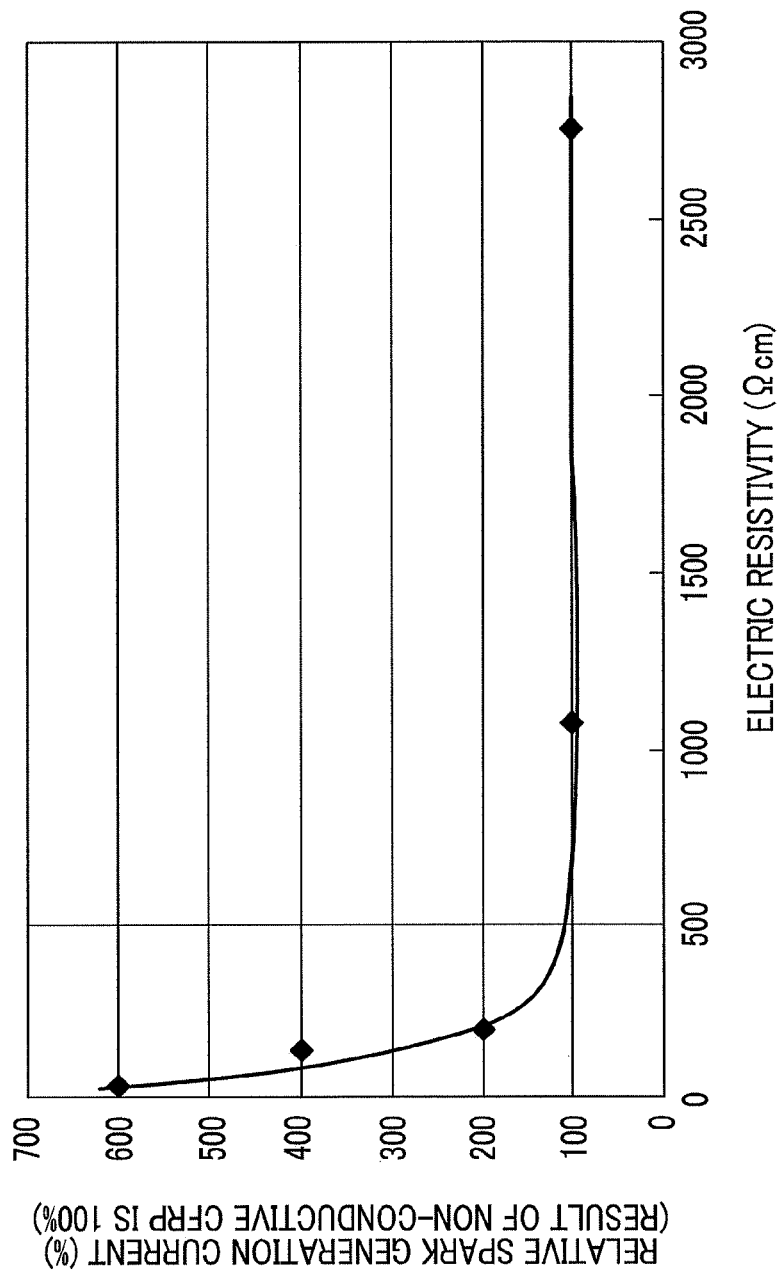
FIG. 8 is a graph showing the relationship between a resistivity [Ωcm] in a plate thickness direction of a test body and a relative spark generation current [%].

FIG. 8 shows the relationship between a resistivity [Ωcm] in a plate thickness direction of the test body and a relative spark generation current [%]. As a result of carrying out the lightning protection test on a plurality of test bodies having different resistivities in the plate thickness direction, the results shown in FIG. 8 were obtained. In FIG. 8, a spark generation current value of each test body when a spark generation current value of the structural member having the CFRP with no electrical conductivity applied thereto is set to be 100% is shown at percentage.

According to the results, if electrical conductivity is applied, whereby the resistivity in the plate thickness direction is less than or equal to 500 Ωcm, the structural member having the CFRP with electrical conductivity applied thereto exhibits superiority in relative spark generation current, and in particular, if the resistivity in the plate thickness direction is less than or equal to about 200 Ωcm, it is found that the relative spark generation current becomes double or more.

That is, in the CFRP with electrical conductivity applied thereto in which the resistivity in the plate thickness direction is less than or equal to 500 Ωcm, it was confirmed that it was possible to suppress the generation of a spark due to a lightning current at the time of a lightning strike, compared to the CFRP with no electrical conductivity applied thereto, and in the CFRP with electrical conductivity applied thereto in which the resistivity in the plate thickness direction is less than or equal to about 200 Ωcm, it was confirmed that it was possible to further suppress the generation of a spark due to a lightning current at the time of a lightning strike.

In addition, the embodiment described above has been described with regard to a case of the fuel tank 13 which is called an integral tank integrated with a main wing of an aircraft. However, the present invention is not limited to this example. The present invention can also be applied to, for example, a structural member which is used for a container (a fuel tank) of a fuel cell through which fuel flows. Furthermore, the present invention can also be applied to a structural member of a fuel tank which is installed in a fuselage of an aircraft or a structural member of a fuel tank which is mounted on a mobile body such as an automobile other than an aircraft.

REFERENCE SIGNS LIST

1: main wing
3: upper skin
5: lower skin
7: front spar
9: rear spar
11: rib
11a: cut surface

11A: flange
11B: web
12: sealant
13: fuel tank
15: reinforcing material
17: matrix

The invention claimed is:

1. A fuel tank comprising:
a structural member using carbon fiber reinforced plastic in which a reinforcing material includes carbon fibers and a matrix includes plastic,
wherein the matrix has electrical conductivity applied thereto,
the carbon fibers included in the reinforcing material provided on a cut surface of the structural member, which is formed by cutting the structural member, are exposed to an inside in which fuel is accommodated without providing a sealant on the cut surface, and
the carbon fiber reinforced plastic used for the structural member has a resistivity in a plate thickness direction of less than or equal to 500 $\Omega$cm by the electrical conductivity applied to the matrix.

2. A main wing having the fuel tank according to claim 1 as a structural body thereof.

3. An aircraft fuselage comprising the fuel tank according to claim 1.

4. An aircraft comprising the main wing according to claim 2.

5. A mobile body comprising the fuel tank according to claim 1.

6. An aircraft comprising the aircraft fuselage according to claim 3.

* * * * *